T. RIOS.
TORTILLA BAKING MACHINE.
APPLICATION FILED DEC. 18, 1917.
1,277,125.
Patented Aug. 27, 1918.
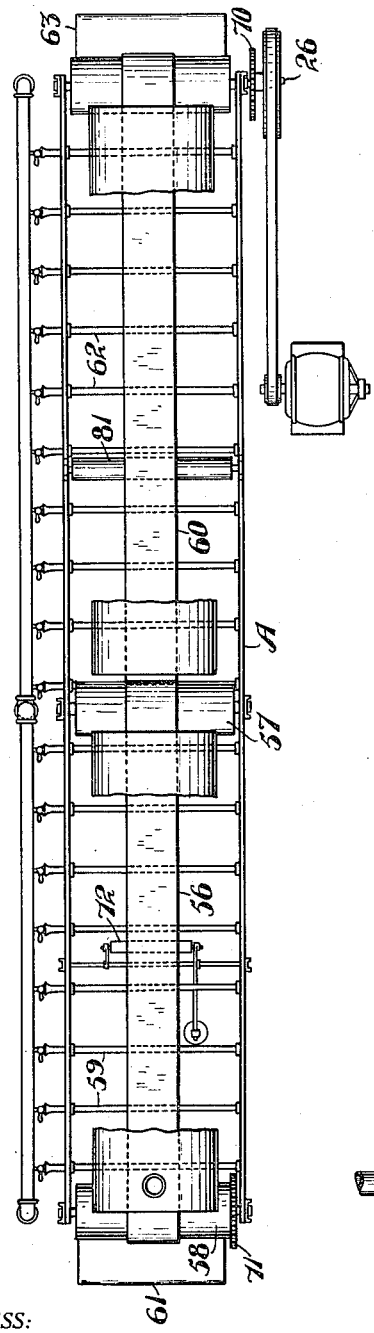
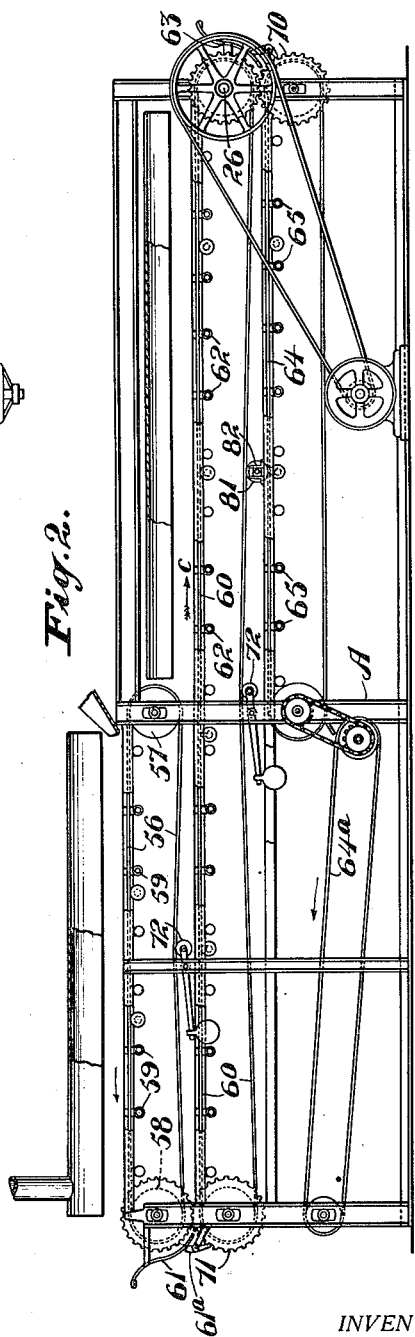
WITNESS:
F. C. Fliedner
J. C. Benesch.
INVENTOR.
Tomas Rios,
BY
Strong & Townsend
ATTORNEYS.

UNITED STATES PATENT OFFICE.

TOMAS RIOS, OF MONTEREY, MEXICO.

TORTILLA-BAKING MACHINE.

1,277,125.

Specification of Letters Patent.

Patented Aug. 27, 1918.

Application filed December 18, 1917. Serial No. 207,646.

*To all whom it may concern:*

Be it known that I, TOMAS RIOS, a citizen of Mexico, residing at Monterey, in the State of Nuevo Leon, Mexico, have invented new and useful Improvements in Tortilla-Baking Machines, of which the following is a specification.

This invention relates to the baking of tortillas (a kind of corn cake of Mexican origin). This application is a continuation in part of my application, Serial No. 43,059, filed August 2nd, 1915, entitled Tortilla forming and baking machine.

In baking tortillas it is desirable to bake the rather thin cakes in stages. This is done by subjecting the lower surfaces of the cakes to heated plates and turning them over one or more times, thereby forming a crust on both sides which is expanded by the steam formed from the moisture within the dough. The machine consists of a plurality of superposed moving endless conveyers, in the present instance, three, passing over heating devices and arranged to turn over to deliver the tortillas to the conveyer immediately beneath.

One form which my invention may assume is exemplified in the following description and illustrated in the accompanying drawings, in which—

Figure 1 shows a plan view of a device embodying my invention.

Fig. 2 shows a side elevation of the same.

The machine here shown comprises a main frame A having at its top portion an endless flexible metallic conveying belt 56. This belt is carried upon rollers 57 and 58 journaled upon the frame and the belt is continuously heated by means of a plurality of gas burners, such as indicated at 59. Dough cakes of the proper form are deposited on the forward end of the belt and are carried along thereby and exposed to the heat of the burners 59. In this manner they are baked partially on one side and at the discharge end of the belt they are automatically turned and delivered on to a second endless flexible metallic conveyer, indicated at 60, which is arranged below the conveyer 56 and runs in a direction opposite thereto. This second conveyer is about twice the length of the belt 56.

The turning of the cakes while being transferred from one belt to another is accomplished by means of a curved plate 61 arranged at the opposite end of the first conveyer and following the contour of the lower portion thereof, being fitted closely enough thereto to prevent the cakes from falling away. The cakes are thus deposited on the second belt 60 on their reverse sides and are then conveyed in the direction of the arrow *c* and exposed to the heat of a series of burners 62 arranged beneath said belt 60 throughout the length thereof. Owing to the longer run of this belt 60 the cakes will here be completely baked on the side exposed to the belt. Upon reaching the discharge end of the belt 60 the cakes are again turned by a plate 63, similar to the plate 61, and delivered on to a third belt 64 beneath the belt 60 and running in the same direction as the belt 56. The belt 64 is about the same length as the belt 56 and is heated throughout its length by means of burners 65. The sides of the cakes which are first baked but partially on the upper belt are completely baked on the lowermost belt and are discharged therefrom on to a conveyer belt 64ª which carries the product away from the machine.

The baking belts above described consist of connected sections of thin sheet iron, but may be constructed in any suitable manner. They are all driven in unison and at approximately the same speed from the main driving shaft 26 by means of the gears, indicated at 70 and 71, and are supported at suitable intervals, intermediate of the driving pulleys, by means of belt tighteners 72 which not only serve to support the intermediate sections of belt but also automatically take up any slack, due to expansion, when the belts are heated by the several burners.

The dough from which tortillas are baked consists largely of corn-meal and contains a high percentage of water. The baking of the cakes presents more or less of a problem as the cakes are very brittle and must be cooked or baked in approximately the following manner: The cake delivered to the first baking belt 56 is first slightly baked on one side. The cake is then delivered to the second belt which is approximately twice as long as the first belt. The cake is here subjected to baking action which completes the baking of one side of the cake and also cooks the interior of same. This is necessary in order to retain the corn flavor and also to prevent the cake from becoming tough. The steam generated inside of the cake thoroughly cooks it and the slight crust formed by the first operation prevents steam from escaping too freely and also prevents the aroma and flavor of the corn from escaping.

The cake is then delivered to the third and last belt 64 where the baking section is completed. The baking operation just described is a mechanical imitation of the method employed by the natives and the product produced is, if anything, superior, as every cake is subjected to exactly the same treatment.

To insure that the cakes do not stick to the turning plates 61 and 63, a vibrating member 61$^a$ is disposed beneath each of the lower free ends of the plates and vibrates them as actuated by the teeth of the gears 70 and 71, respectively.

In practice it has been found that the first baking operation of the individual cakes while passing over the belts 56 and 60 causes a skin to form on the exterior of the cake. This skin prevents the steam generated within the cake from escaping, consequently causing the cake to swell or puff up to a considerable extent. For the purpose of swelling the cake, a weighted roller 81 has been provided. This roller is loosely mounted in guide brackets 82 directly over the lower belt 64. Every cake supported by the belt 64 and traveling with same is consequently forced under roller 81. As this is sufficiently heavy it compresses each succeeding cake, forcing steam throughout the uncooked center of the cake so that after the pressure is relieved the cake will expand and thereafter be cooked by the steam entrapped therein. In this manner the cake will be thoroughly cooked and will not be tough.

Having thus described my invention, what I claim and desire to secure by Letters Patent is:

1. In a machine for baking tortillas, a plurality of superposed, moving, endless conveyers, means for heating said conveyers to bake tortillas deposited upon the upper sides thereof, said conveyers being so related that each upper conveyer is arranged to turn over and deliver the tortillas carried thereby to the conveyer immediately therebeneath.

2. In a device of the class described, a frame, upper and lower belt conveyers mounted to move on the frame, and a relatively fixed arcuate cake turner located at one end of the upper conveyer and adapted to receive cakes therefrom, to reverse the cakes as the same are deposited on the lower conveyer, and means for heating the conveyers.

3. In a tortilla baking machine, a plurality of movable baking means upon which the tortillas are carried to be baked upon the side exposed thereto, one of said baking means delivering its tortillas on to the other and means for turning the tortillas as they pass from one to the other of the baking means.

4. In a tortilla baking machine, a plurality of moving, endless conveyers upon which the tortillas are carried, means for heating the conveyers to bake the tortillas on the side exposed thereto and means for receiving tortillas discharged by one of said conveyers and turning the same so that the unbaked sides of the tortillas will be exposed to the second conveyer.

5. In a tortilla baking machine, a series of superposed moving endless conveyers, means for heating said conveyers to bake tortillas deposited on the upper sides thereof, said conveyers being so related that the upper conveyer is arranged to turn over and deliver the tortillas carried thereby to the conveyer immediately therebeneath, said series of conveyers including three such, the top and bottom ones being each approximately one-half the length of the intermediate one, whereby the tortillas are first baked but partially on one side, then wholly upon the opposite side and lastly baking of the first mentioned side is completed.

6. In a device of the class described, a plurality of moving baking means upon which cakes are carried to be baked, one of said means delivering its cake onto the other, means for turning the cakes during said delivery operation, and means adapted to affect the turning means to prevent the sticking of the cakes thereon.

In testimony whereof I have hereunto set my hand in the presence of two subscribing witnesses.

TOMAS RIOS.

Witnesses:
A. BRANDI,
V. INGNANSS.